United States Patent
Townsend, Jr. et al.

[15] 3,660,067
[45] May 2, 1972

[54] GLASS-FORMING APPARATUS

[72] Inventors: Leyshon W. Townsend, Jr., Worthington; Warren E. Wilburn, Columbus, both of Ohio

[73] Assignee: Owens-Illinois, Inc.

[22] Filed: Jan. 26, 1970

[21] Appl. No.: 5,745

[52] U.S. Cl. ...................................... 65/302, 65/71, 65/362
[51] Int. Cl. ........................................ C03b 11/06
[58] Field of Search ........................... 65/302, 71, 362

[56] References Cited

UNITED STATES PATENTS 1,342,056  6/1920  Miller .................................. 65/362

Primary Examiner—S. Leon Bashore
Assistant Examiner—Robert L. Lindsay, Jr.
Attorney—D. R. Birchall and E. J. Holler

[57] ABSTRACT

In the operation of a plunger to form the yoke area of an article centrifugally formed in a mold, a ball and socket assembly is provided between the plunger and its associated spindle which permits the plunger to freely float from the formed glass article upon withdrawal of the plunger, thus obviating the production of crizzles and checks due to lateral pressure of the plunger on the side walls of the formed glass article.

4 Claims, 3 Drawing Figures

INVENTOR.
LEYSHON W. TOWNSEND JR
WARREN E. WILBURN

ATTORNEYS

INVENTOR.
LEYSHON W. TOWNSEND JR
WARREN E. WILBURN
BY
ATTORNEYS

3,660,067

GLASS-FORMING APPARATUS

THE INVENTION

The invention relates to the manufacture of hollow glass articles by pressing and centrifugally molding the article; more particularly, the invention relates to a plunger apparatus for molding generally conically-shaped articles by a combined press and spin process.

Briefly stated, the apparatus of the present invention includes a press plunger having both cylindrical and frusto-conical forming surfaces at its lower extremity which cooperates with a bottom apex region of an open-topped generally frusto-conical mold rotatable about a vertical axis. The present apparatus is of particular utility for use with the apparatus and method disclosed in U. S. Pat. No. 3,132,018, filed Sept. 26, 1960, entitled "Centrifugal Casting Apparatus for Making a Glass Article." In such apparatus, a movable plunger is supported from a mounting member for vertical displacement relative to the path of a plurality of individually rotatable mold cavities. The mounting member carries the subject pressing plunger in downwardly-projecting depending relation for axial insertion into each mold cavity when disposed therebelow. The pressing plunger is able to effect pressing action on the molten glass charge introduced into the mold immediately subsequent to the introduction of the charge and is retractable from major contact with the glass charge prior to centrifugal formation of the sidewalls of the glass article immediately following the pressing operation. The plunger is adapted to press form a portion of the charge in proper angular relation with the mold and is normally non-rotatable during its pressing action. However, it may be permitted to freely rotate immediately following the pressing operation and prior to its full retraction upwardly from the centrifugal mold to function further in charge distribution for centrifugal casting of the remaining portion of the charge.

Prior to this invention, the plunger was fixedly attached to the mounting member. Such a plunger is disclosed in U.S. Pat. No. 3,132,018 of Prendergast and Stutske, issued Oct. 6, 1964. Because of the difficulty in aligning the plunger with each individual mold cavity placed thereunder, the plunger does not always enter the mold cavity along the central axis of the cavity. When this happens, the plunger, during pressing, will tend to seek the center line of the mold, then upon withdrawal, the plunger will exert horizontal forces to the interior of the neck portion of the formed glass article.

The present invention is directed towards overcoming the difficulties inherent in press-forming television bulb funnels, and specifically, the defects arising from misalignment of the plunger with the mold and its subsequent withdrawal. The misalignment results in excess lateral pressure being applied against the interior of the yoke of the funnel by the plunger itself upon withdrawal, causing two types of defects.

One resulting defect is referred to in the trade as "crizzle," "pressure checks" or "pressure cracks." This defect is usually visible on the inside or the outside of the yoke area of the glass article being formed and is characterized by many small cracks or checks upon the surface of the glass. The second resulting defect is characterized by a lack of uniformity in wall thickness in the yoke or neck area of a funnel.

It must be remembered that in solving the problems relating to plunger withdrawal it is necessary during the pressing cycle to have the plunger fixedly connected to the mounting member. This assures that the plunger, during pressing, preforms the glass charge to conform to the external configuration of the plunger prior to centrifugal casting. If the plunger were free-floating during pressing, it is possible that it would pivot from side to side and preform the charge to a shape and volume greater than the shape and volume of the plunger. It is important that the glass charge, prior to centrifugal casting, conform to the plunger shape since that shape has been designed to produce the desired sidewall thickness of the article upon later spinning. Therefore, during pressing, the plunger must be fixedly attached to the mounting member.

SUMMARY OF THE INVENTION

It is the purpose of this invention to provide a pressing plunger which is insertable into a rotatable centrifugal mold to engage a molten gob of glass introduced into the mold. The plunger includes a body portion having a central axis and a downwardly projecting surface capable of forming the central interior of a hollow glass article, a mounting member adjacent to the body portion to hold it in spaced relation to the mounting member and also pivoting means coupled between the body portion and the mounting member to non-rotatably pivot the body portion about its vertical central axis. This permits the body portion of the plunger to pivot freely upon withdrawal.

It is an object of this invention to provide a plunger for forming hollow glass articles which is non-floating during pressing and free-floating during withdrawal so as not to exert lateral pressure to the side of the neck area of the article formed.

It is an object of this invention to provide a free release plunger which may be withdrawn from a mold cavity without exerting lateral pressure to the interior walls of the article being formed.

Another object of the invention is to provide a plunger for forming glass article which will align itself with the formed article upon withdrawal from the mold cavity.

With these objects in mind, the accompanying drawings illustrate the preferred embodiment of the plunger.

Figure 1:
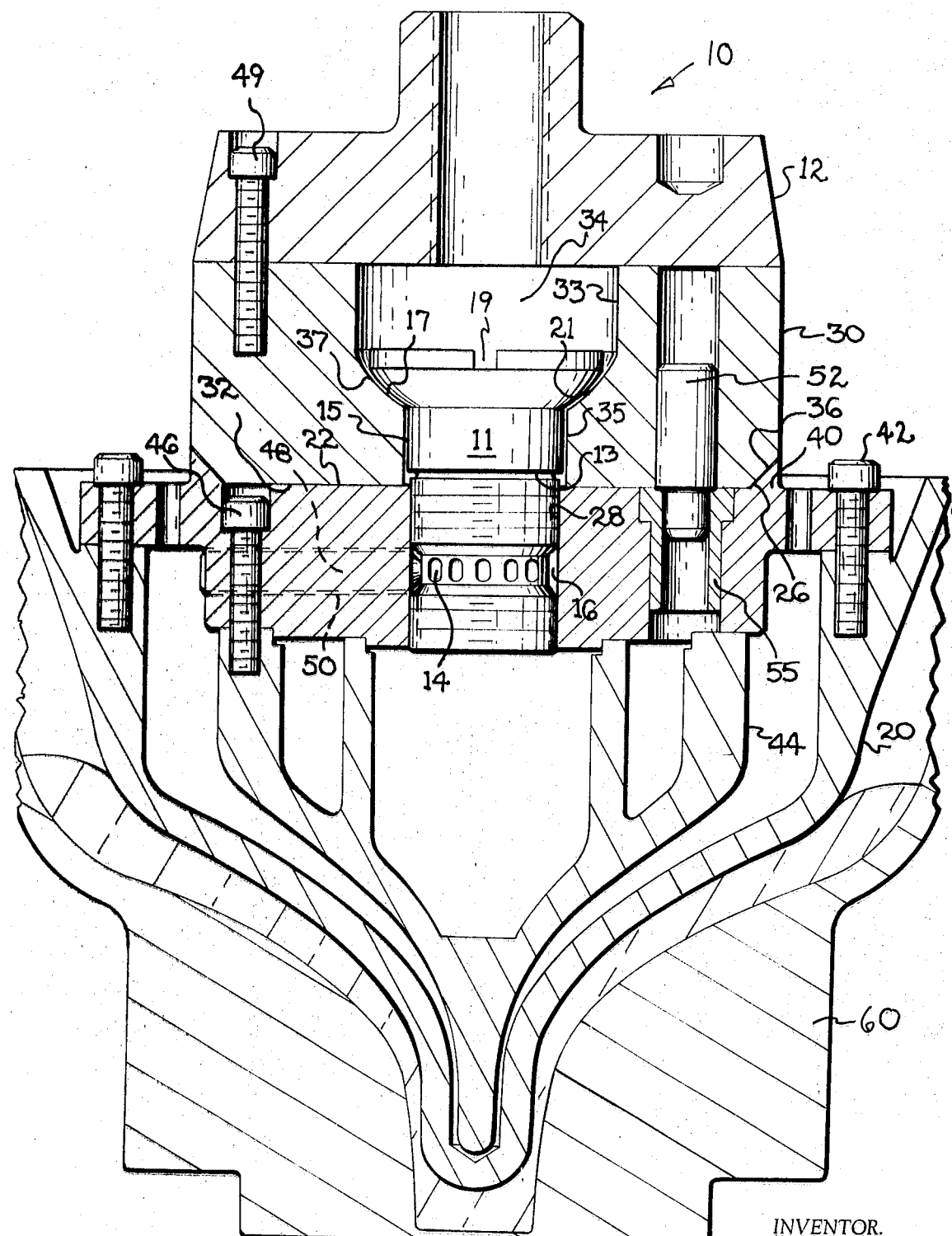
FIG. 1 is a partial sectional view of a plunger in a down position inside the mold cavity.

In FIG. 1, numeral 10 refers generally to a pressing tool which includes a distributing skirt 20 and a cylindrical mounting block 30. Skirt 20 may be of any shape and size conforming to plungers now known in the art. Interspaced between skirt 20 and block 30 is a flanged head portion 40. Head portion 40 is connected to skirt 20 by a plurality of threaded bolts 42. Between skirt 20 and head 40 is a funnel-shaped inner wall 44. The inner wall 44 is connected to head 40 and held in spaced relation to skirt 20 by bolts 46.

Upon the top surface 22 of head 40 is a circular beveled ledge 26 which is centrally located with respect to the center axis of head 40. The slope of this ledge may be at any angle greater than 0° and less than 90°. The bottom surface 32 of mounting block 30 also contains a beveled ledge 36. The slope of this ledge may be greater than 0° and less than 90° and should be complemental to the slope of beveled edge 26. During the pressing cycle, beveled edge 26 and 36 contact each other prior to the contacting of surfaces 22 and 32 and thereby align the central axis of block 30 with the central axis of head 40.

Head 40 contains a threaded bore 28 centrally located on its central axis. Within bore 28 is inserted partially threaded pivot pin 11.

The threaded portion of pivot pin 11 also contains an annular slot 16 extending around its periphery. Within slot 16 is located at equidistance, one with respect to another, a plurality of oblong shaped detents 14. At this point, one of the detents 14 should be aligned with horizontal screw 48 of head 40.

The annular flange portion 13 of pivot pin 11 is positioned with respect to the top surface 22 of head 40 by rotating pivot pin 11. Horizontal slot 19 provides some means for rotatably inserting pivot pin 11 into threaded bore 28. Pivot pin 11 is then adjusted so that head 40 is free to pivot about pivot pin 11 when pressing tool 10 is in the up position.

Horizontal bore 50 is located within head 40 so that it substantially aligns with slot 16 of positioned pivot pin 11. After the fine adjustment of pivot pin 11 is completed so that when pressing tool 10 is in the up position, the head and skirt forming the body of the pressing tool are free to pivot about pivot pin 11, a set screw 48 is inserted into bore 50 and into one of the equispaced detents 14. By placing set screw 48 in detent 14, pivot pin 11 is not free to rotate out of bore 28 while the plunger is in operation.

Pivot pin 11 has a smooth cylindrical wall section 15 extending upwardly from the threaded portion of pivot pin 11. This wall section terminates into a frusto-hemispherical top section 17.

Cavity 34 of mounting block 30 also contains a frusto-hemispherical wall section 37 which terminates in its lower section into a smooth cylindrical wall section 35 and extends at its upper section into a similar smooth cylindrical wall section 33 of larger diameter than the maximum diameter of pivot pin 11. Prior to the positioning of cap 12, pivot pin 11 is inserted into bore 28 and adjusted to allow the body of the tool to pivot. Cap 12 is attached to the top of mounting block 30 by bolts 49. In order to attach pressing tool 10 to the pressing machine, cap 12 is threadedly attached to the spindle which is not shown. The action of the spindle causes the pressing tool 10 to move in a vertical direction with respect to the mold cavity 60.

Pin 52 is positioned into block 30 and extends downwardly into bushing 55 which has been pressed into head 40. The diameter of the pin 52 below bottom surface 32 of block 30 is less than the internal diameter of bushing 55. Therefore, pin 52 freely slides within bushing obtained. and is held within block 30. Pin 52 serves the function of preventing the body of the mold from rotating with respect to mounting block 30.

If, in the use of a distribution type plunger with its varied contours, the horizontal axis of the plunger is not properly aligned with respect to the horizontal axis of the rectangular shaped mold cavity during each pressing stroke, the desired glass distribution prior to mold acceleration will not be obtained Upon later centrifugal casting of the sidewalls of the article, the walls may not be completely formed and they may not be of the desired thickness. Therefore, pin 52 has been provided to properly align the horizontal axis of the plunger with respect to the horizontal axis of the mold cavity.

The pressing tool is in a downward position, as shown in FIG. 1, when it is inserted into the mold cavity located below the tool. In this position, the pressing tool is like the plunger previously used in the art in that the body of the tool comprising skirt 20 and head 40 is rigidly held against mounting block 30, the central axis of head 40 is aligned with the central axis of block 30 by means of edges 26 and 36, and head 40 is not free to pivot. Pin 52 also prevents the body portion of the pressing tool form rotating. The height of the wall 15 of pivot pin 11 above surface 22 is adjusted so that it is greater than the height of smooth wall 35 of cavity 34. Therefore, when the top surface 22 and beveled edge 26 of head 40 are brought into tight engagement with bottom surface 32 and complemental beveled edge 36 of block 30, there is formed a space 21 between the complemental frusto-hemispherical wall sections 17 and 37.

Figure 2:
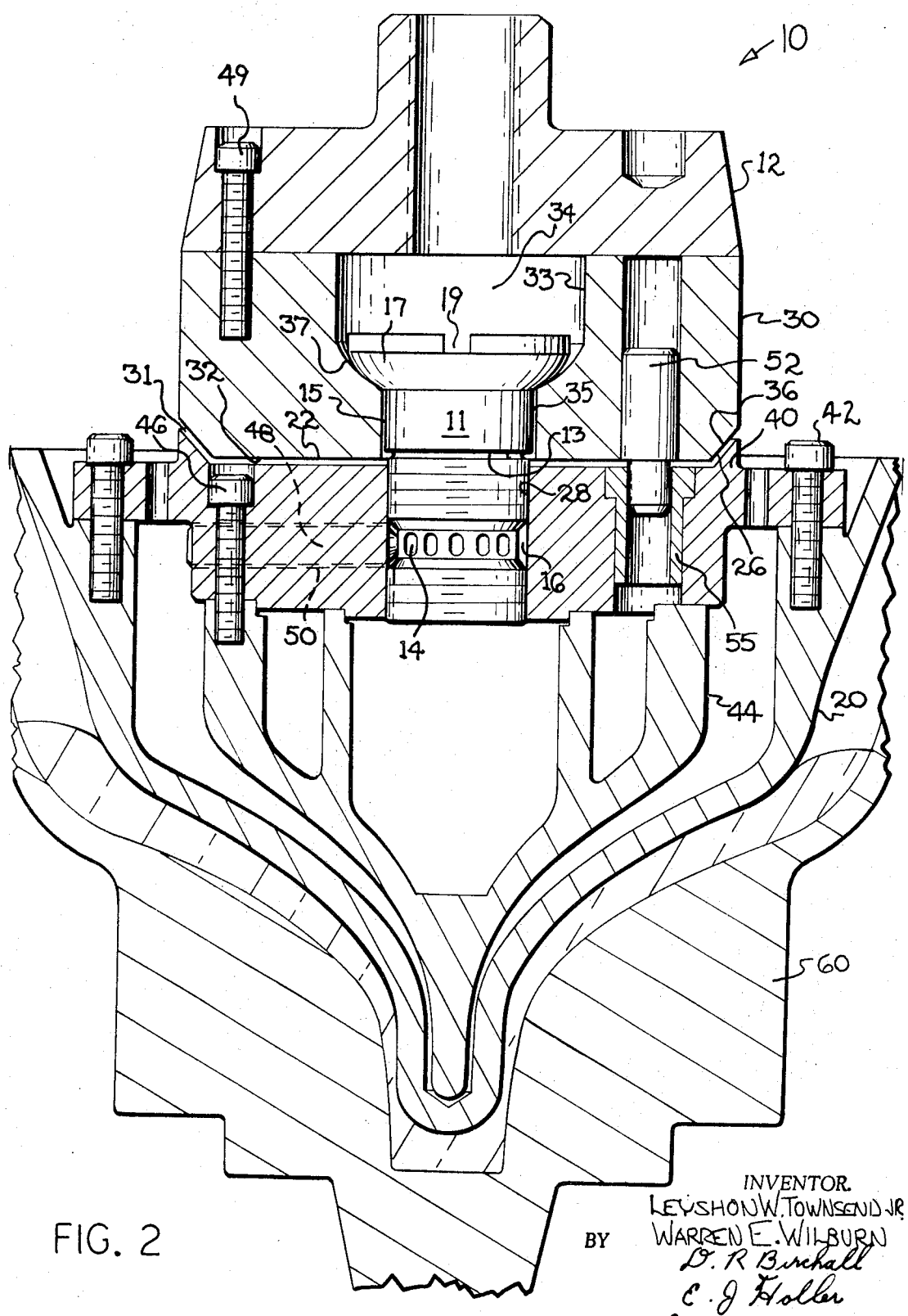
FIG. 2 is a partial sectional view of a plunger in an up position while it is being withdrawn from the mold cavity.

During the upward stroke as shown in FIG. 2, the body portion of the pressing tool is free to pivot about pin 11. Frusto-hemispherical wall sections 37 and 17 are in contact, one with the other, and surface 17 of pin 11 is free to pivot on surface 37 of cavity 34. The amount of free pivotal movement which is transmitted to the lowest tip of skirt 20 is determined by the amount of space 21 between surfaces 17 and 37. The greater the spacing, the more pivot movement permitted.

Figure 3:
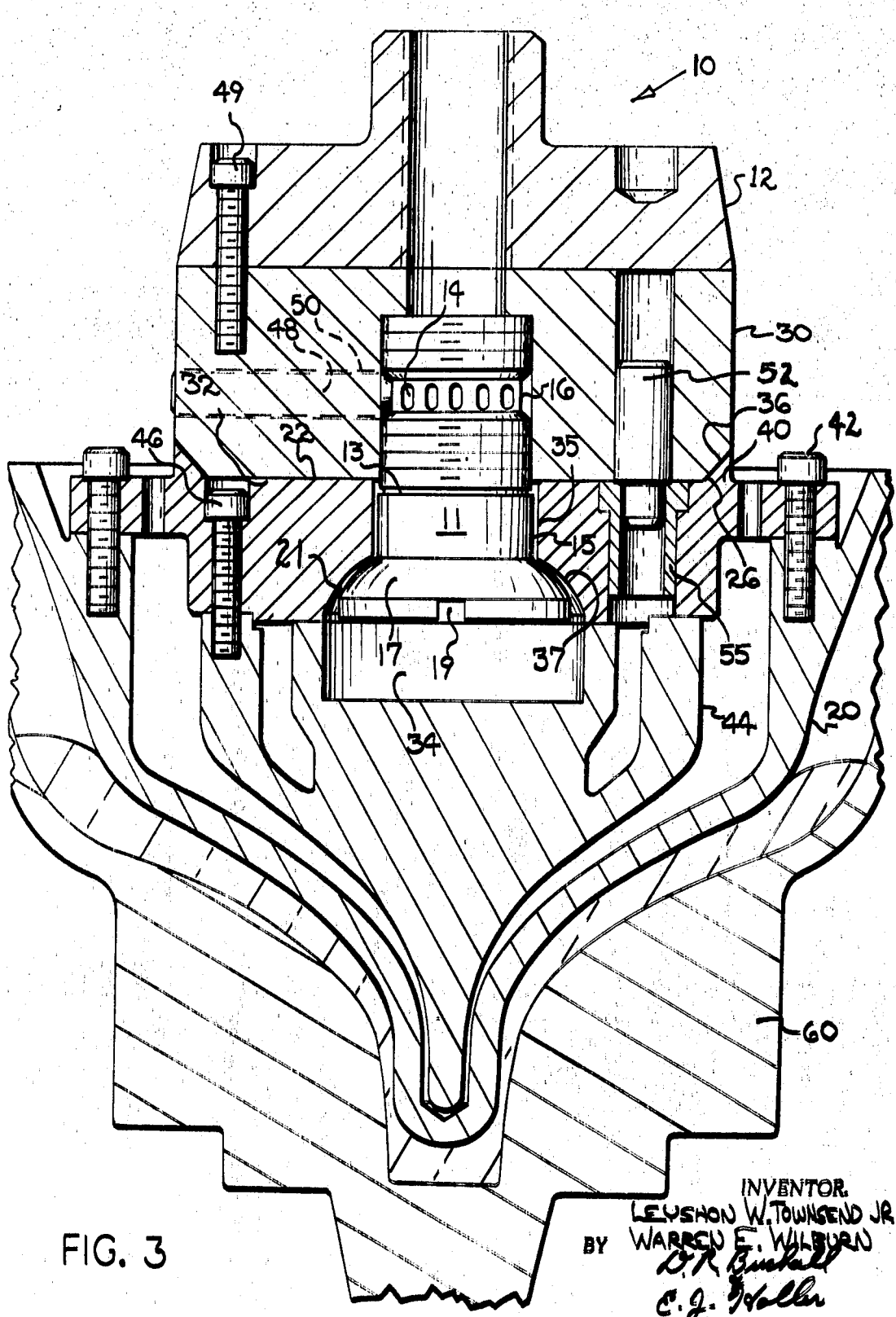
FIG. 3 is a partial sectional view of the second embodiment of the plunger in a down position inside the mold cavity.

Although throughout this description reference has been made to threadedly inserting pin 11 into the body portion, it is understood that the pin could be threadedly inserted into block 30 with fursto-hemispherical cavity 34 located in head 40, as shown in FIG. 3, thereby inverting pin 11 with respect to the body of the plunger.

It can be seen from the above description that this ball and socket arrangement provides a pressing tool which is non-floating during the pressing operation and free-floating during withdrawal, thereby alleviating much of the lateral pressure upon withdrawal which was previously exerted to the side of the neck area of the article being formed.

We claim:

1. A pressing plunger insertable within a mold cavity for shaping a molten gob of glass contained therein comprising; a body portion (20) having a downwardly projecting exterior surface for conforming to the desired internal shape of the article being formed, a head (40) rigidly attached to said body portion, a mounting member (30) positioned adjacent said head for supporting it into and out of pressing relationship with respect to said mold cavity, pivotable movement means (11) coupling said mounting member to said head to permit limited relative axial movement of said body portion and mounting member upon withdrawal of said plunger from said mold cavity.

2. A pressing plunger as claimed in claim 1 wherein said pivotable movement means comprises a pivot pin (11) having a frusto-hemispherical top section 17 and a complemental fursto-hemispherical wall section (37) within which the pivot pin top section (17) is loosely seated.

3. The pressing plunger as claimed in claim 2 wherein aligning means (26, 36) is positioned on said mounting member and on said head to align the central axis of said body portion to the central axis of said mounting member.

4. The pressing plunger as claimed in claim 3 wherein pin means (52) is interdisposed between said mounting member and said head to prevent rotation of said mounting member and said pressing plunger.

* * * * *